United States Patent [19]
Alamprese

[11] 4,114,850
[45] Sep. 19, 1978

[54] MODULATING PLUG VALVE

[75] Inventor: Leo Alamprese, Wood Dale, Ill.

[73] Assignee: Honeywell Inc., Minneapolis, Minn.

[21] Appl. No.: 704,198

[22] Filed: Jul. 12, 1976

[51] Int. Cl.² ........................... F16K 1/48; F16K 1/54
[52] U.S. Cl. ....................................... 251/86; 251/88; 251/122
[58] Field of Search ...................... 251/122, 85, 86, 88

[56] References Cited
U.S. PATENT DOCUMENTS

| 2,318,933 | 5/1943 | Eilers et al. ........................... 251/122 |
| 2,879,794 | 3/1959 | Costello ............................. 251/85 X |

FOREIGN PATENT DOCUMENTS 164,643  6/1921  United Kingdom ...................... 251/86

Primary Examiner—Arnold Rosenthal
Attorney, Agent, or Firm—Trevor B. Joike

[57] ABSTRACT

A modulating plug valve is disclosed having a valve seat for providing communication between the inlet and outlet openings of the valve, a stem extending through the valve housing, a disc mounted on the valve stem for allowing angular movement of the disc with respect to the stem for seating against the valve seat to cut off communication between the inlet and outlet openings and a plug mounted on the valve stem for lateral and angular motion with respect to the stem for modulating the fluid flow between the inlet and outlet openings when the disc is not seated against the valve seat.

13 Claims, 2 Drawing Figures

MODULATING PLUG VALVE

BACKGROUND OF THE INVENTION

This invention relates to an improved modulating plug type valve for controlling the flow of fluids. More particularly, the invention relates to an arrangement for mounting the plug and disc of a plug valve onto the valve stem for allowing a higher degree of accuracy in the modulation of the fluid flow.

Plug and disc type valves are known in the prior art. Such valves comprise a disc cooperating with the valve seat for cutting off fluid flow from the inlet to the outlet openings of the valve. This disc is movably attached to the valve stem for allowing the disc to angularly align with the valve seat.

Rigidly affixed to the disc is a plug which, when the disc is seated against the valve seat, extends into the valve seat. The plug is contoured such that, as the valve disc lifts off the valve seat to permit flow from the inlet opening to the outlet opening, the amount of flow is regulated by an amount determined by the amount of separation between the disc and seat. The surface of the plug must be characterized, i.e. contoured, to compensate for the non-linearity of the operator of the valve. Since the plug is rigidly fixed to the valve stem and disc assembly, the plug must be sized to provide enough tolerance between the plug and valve seat to allow the plug to easily move within the valve seat but yet allow for modulation of the flow from inlet to outlet.

This tolerance must necessarily be large since the disc and plug are rigidly secured together and any angular movement of the disc to seat against a misaligned valve seat also results in angular movement of the plug. Because this tolerance must be sufficiently large for accomplishing these purposes, the initial separation of the disc from the valve seat allows a surge of fluid to flow from inlet to outlet. Thus, the modulating effect for small openings of the valve is minimal. Furthermore, the prior art arrangement of attaching the disc and plug to the valve stem is costly,.

The prior art also has the disadvantage that the forces imposed upon the plug and disc assembly are applied through the alignment mechanism. Heavy loads and friction on the plug and disc assembly and alignment mechanism, therefore, impede the alignment of the plug within the port defined by the valve seat creating excessive loads and wear on the valve stem.

SUMMARY OF THE INVENTION

To increase the modulating effect for small openings of the valve, to reduce the loading on and wearing of the valve stem and to reduce the cost of construction, the valve stem is arranged to pass through both the disc and plug whereby the disc is arranged for angular movement with respect to the valve stem around an O-ring and the plug is arranged for lateral and angular movement with respect to the valve stem to allow the plug to slide easily within the valve seat. Thus, the action of the disc and the plug are independent such that the plug is not affected by the alignment of the disc to the valve seat. Also, there are no heavy load and friction problems as there are in the prior art devices. As the valve disc approaches a misaligned seat, the disc merely tips or pivots to align itself to the seat and the plug floats freely on the stem as it enters the port or seat. As a result of this independence of plug and disc, the tolerance between the plug and valve seat may be reduced to increase the modulating effect for small openings of the valve and the arrangement for extending the valve stem through the disc and valve plug reduces the cost of the overall valve.

BRIEF DESCRIPTION OF THE DRAWINGS

These and other advantages and features of the invention will become apparent from a review of the drawings in which.

DETAILED DESCRIPTION OF THE DRAWINGS

Figure 1:
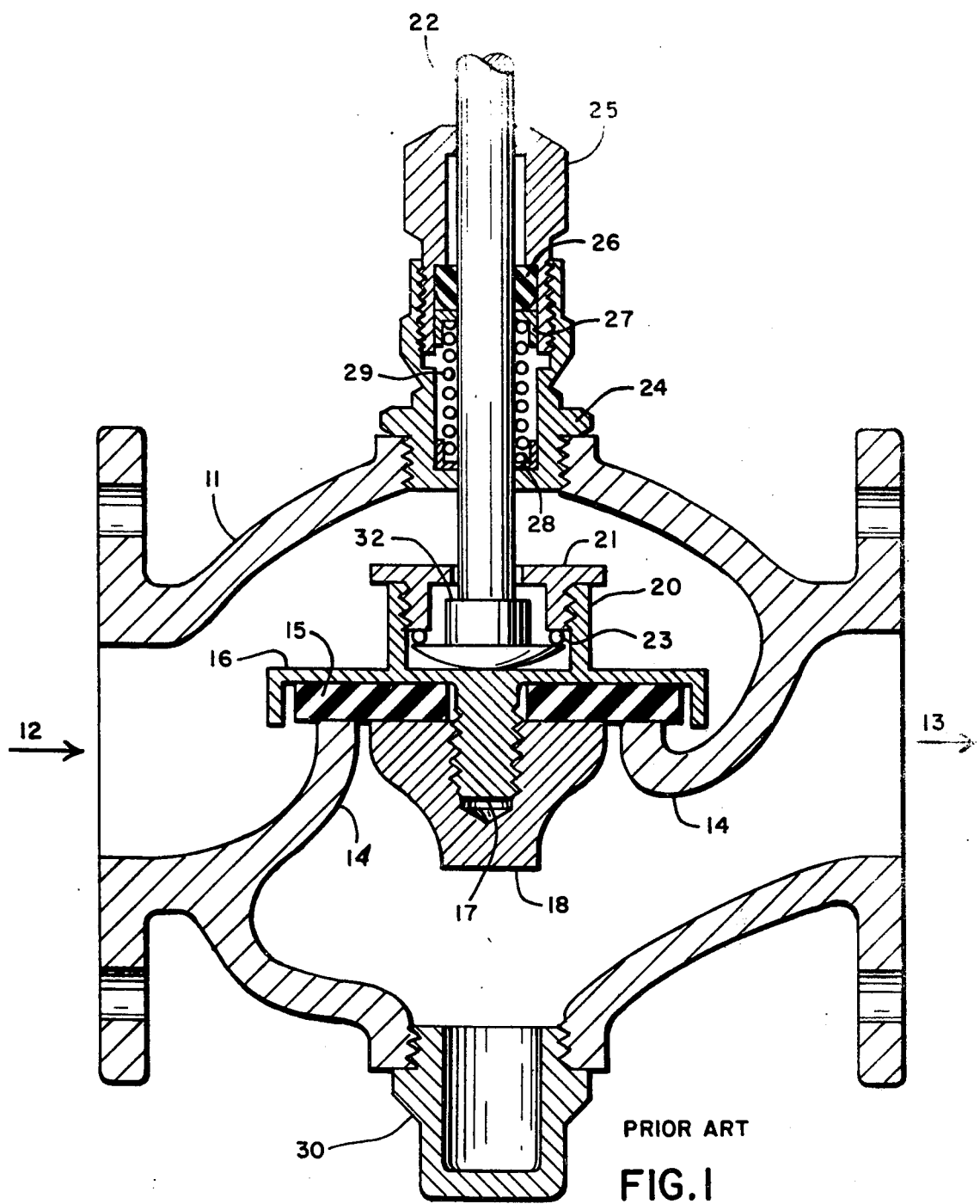
FIG. 1 is a cross-sectional view of a prior art valve.

FIG. 1 shows the prior art valve arrangement which comprises housing 11 having inlet opening 12 and outlet opening 13. The internal walls of the valve are arranged to provide valve seat 14 for cooperation with disc 15 which, when it seats against valve seat 14, closes off communication between inlet opening 12 and outlet opening 13. Disc 15 is housed within disc holder 16 having threaded extention 17 for cooperating with a threaded bore in plug 18. Plug 18 is contoured to modulate the flow between inlet opening 12 and outlet opening 13 when disc 15 is separated from valve seat 14. The contour has a shape to linearize flow even though the operator of the valve controls the valving operation non-linearly.

Disc holder 16 has a cylindrical wall or cup 20 which is internally threaded to receive stem retainer or nut 21. Valve stem 22 extends through the housing and terminates in a stem head 32 which is retained within cup extention 20 of disc holder 16 by stem retainer 21. An O-ring 23 is provided for allowing angular motion of disc 15, disc holder 16 and plug 18 assembly with respect to valve stem 22. Valve stem 22 extends through the valve housing and through bonnet 24 which threadably engages valve housing 11. Bonnet 24 in turn threadably engages packing gland 25 which has packing 26 located therein. The packing 26 is held in place by packing washers 27 and 28 with a spring 29 operating against both packing washers 27 and 28 to bias packing washer 27 against packing 26. Body plug 30 may also be provided.

The valve in FIG. 1 is shown in its closed position with disc 15 seated against valve seat 14. When the valve is to be opened, the operator, which may be a solenoid (not shown), is energized which operates valve stem 22 to lift disc 15 off of valve seat 14. As disc 15 separates from valve seat 14, an amount of fluid will flow between inlet 12 and outlet 13 dependent upon the amount of separation and, thus, the position of the plug 18 with respect to valve seat 14. Because plug 18 is rigidly attached to the disc holder 16 and disc 15 arrangement, the tolerance must be sufficient to provide a proper clearance between plug 18 and valve seat 14. However, this tolerance allows a surge of fluid through the valve when disc 15 first lifts off valve seat 14. Thus, the modulating effect for small openings of the valve is minimal.

The only motion allowed the disc 15 and plug 18 assembly is in the stem head 32 and retainer 21 section because of O-ring 23. This motion essentially only allows proper alignment of the disc 15 to seat 14 and, since plug 18 is rigidly attached to disc holder 16, the tolerance which allows friction free movement of plug 18 within seat 14 allows little modulation for small openings of the valve. Furthermore, plug 18 must be threaded to receive threaded extention 17 of disc holder 16 which, together with the method of connecting the disc holder 16 to the stem 22, results in an expensive assembly for the valve.

Figure 2:
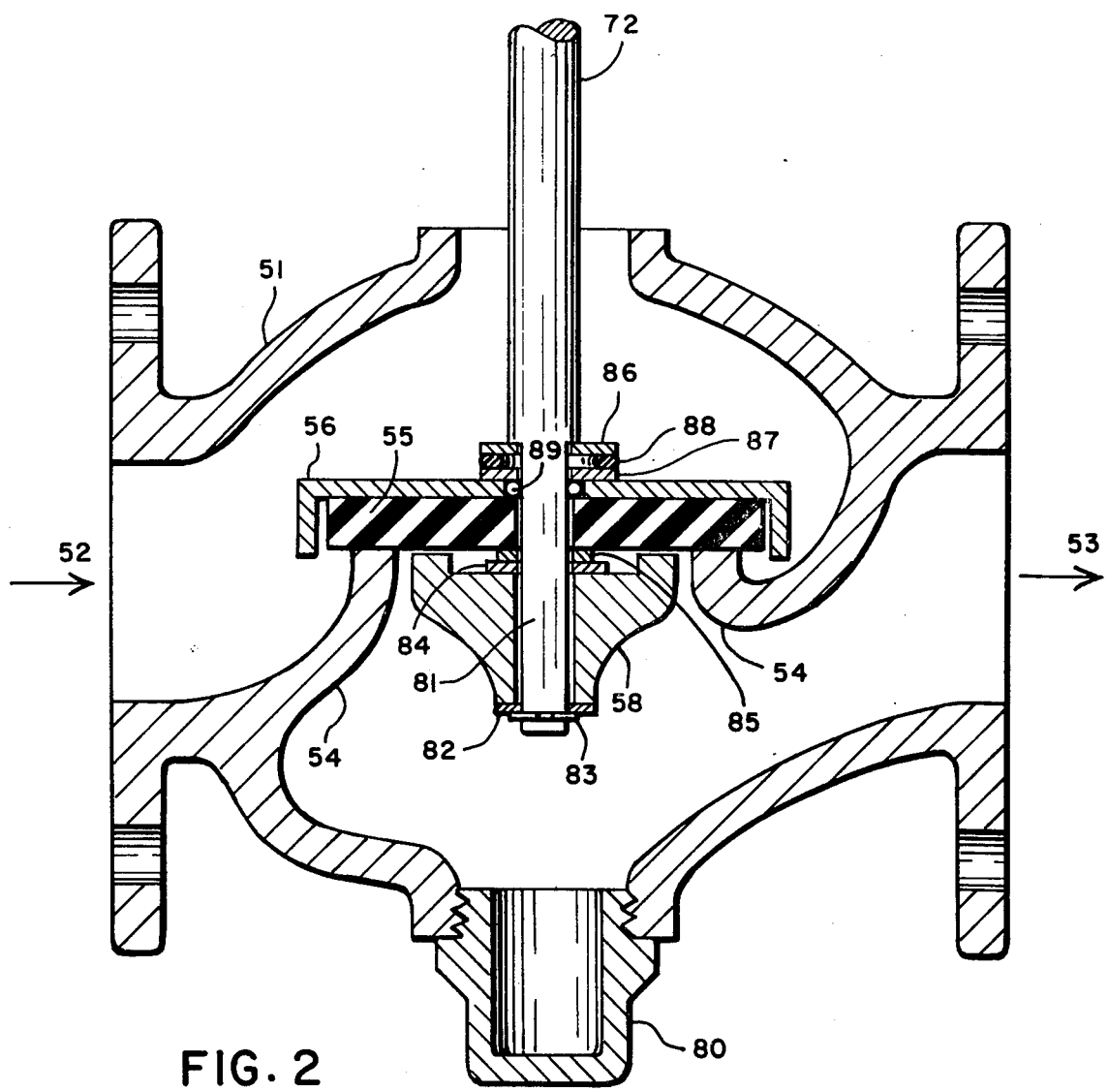
FIG. 2 is a cross-sectional view of the valve according to the invention.

The apparatus shown in FIG. 2 provides a more economical valve and a valve which increases the modulating effect for small openings. Valve housing 51 incorporates valve seat 54 for providing fluid communication between inlet opening 52 and outlet opening 53. Disc or sealing disc 55 is provided for seating against valve seat 54 and is contained in disc holder 56 in the form of a cup. Plug 58 is also mounted on valve stem 72 for modulating the flow of fluid between inlet opening 52 and outlet opening 53 when disc 55 is lifted off valve seat 54. Plug 58 has a bore extending therethrough to receive reduced extension 81 of valve stem 72 and is held onto extension 81 by washer 82 and E-ring 83 as well as washer 84 and spring washer 85. Disc holder 56 and disc 55 have cooperating bores therethrough for allowing extension 81 of valve stem 72 to extend therethrough and the disc 55 and disc holder 56 assembly is held onto extension 81 by spring washer 85 on one side and washers 86 and 87 together with spring washer 88 on the other side. In the bore of disc holder 56 is an O-ring 89 for sealing the inlet and outlet openings when disc 55 is seated against valve seat 54 and also for providing angular motion of the disc 55 and disc holder 56 assembly relative to valve stem 72. This rotary motion allows proper alignment of disc 55 to valve seat 54 when disc 55 is seated against valve seat 54. The bore in plug 58 is dimensioned to allow lateral and angular motion of plug 58 with respect to valve stem 72 to allow the plug to move easily within the valve seat 54. Thus, the plug 55 and disc 56 assembly is mounted to stem 72 independently of plug 58 which, as pointed out above, allows a tighter tolerance between plug 58 and valve seat 54 for increasing the modulating effect upon small openings of the valve.

Since the threading of plug 18 and valve stem 22 of the valve of FIG. 1 have been eliminated, the cost of assembly of the valve has been reduced substantially. Moreover, the elimination of stem retainer 21 and stem head 32 of FIG. 1 along with cup extension 20 of disc holder 16 and their replacement by a simple washer arrangement for attaching disc 55 and disc holder 56 to valve stem 72 of FIG. 2 has contributed to the cost reduction. Plug 58 of FIG. 2, like plug 18 of FIG. 1, is contoured to provide linear control of the fluid flow through the valve even though the operator which drives the valve stem provides a non-linear output with respect to its input. Body plug 80 may be provided in the valve construction of FIG. 2.

Thus, a more economical assembly of the plug valve is provided and an increased modulating effect for small openings of the valve is obtained.

The embodiments of the invention in which an exclusive property or right is claimed are defined as:

1. A valve comprising:
a housing having inlet and outlet openings;
a valve seat within said housing for permitting a flow of fluid from said inlet opening to said outlet opening;
a valve stem extending through said housing;
disc means mounted on, and for angular movement with respect to, said valve stem for seating against said valve seat to cut off said flow when said stem moves said disc means against said valve seat;
plug means; and,
mounting means for mounting said plug means on said valve stem for permitting lateral and angular motion of said plug means with respect to said valve stem and said disc means;
said plug means for modulating said flow when said disc means is moved away from said valve seat by said valve stem.

2. The valve of claim 1 wherein said disc means comprises a disc holder and a sealing disc mounted within said disc holder.

3. The valve of claim 2 wherein said disc holder comprises a cup having a bore extending therethrough and said sealing disc having a bore extending therethrough and wherein said valve stem extends through both said bores.

4. The valve of claim 3 wherein said disc means further comprises an O-ring seal mounted around said stem and within said bore of said disc holder.

5. The valve of claim 4 wherein said disc means further comprises washers for securing said disc means to said valve stem.

6. The valve of claim 1 wherein said plug means comprises a plug contoured to modulate flow from said inlet opening to said outlet opening when said disc means is moved away from said valve seat by said valve stem.

7. The valve of claim 6 wherein said plug further comprises a bore extending therethrough and wherein said valve stem extends through said plug bore, said bore being of sufficient size to allow lateral angular motion of said plug with respect to said valve stem and said disc means.

8. The valve stem of claim 7 wherein said mounting means comprises washers for securing said plug to said valve stem.

9. The valve of claim 7 wherein said disc means comprises a disc holder and a sealing disc mounted within said disc holder.

10. The valve of claim 9 wherein said disc holder comprises a cup having a bore extending therethrough and said disc having a bore extending therethrough and wherein said valve stem extends through both said bores.

11. The valve of claim 10 wherein said disc means further comprises an O-ring seal mounted around said valve stem and within said bore of said disc holder.

12. The valve of claim 11 wherein said disc means further comprises washers for securing said disc means to said valve stem.

13. The valve of claim 5 wherein said plug means comprises a plug contoured to modulate flow from said inlet opening to said outlet opening when said disc means is moved away from said valve seat by said valve stem.

* * * * *